United States Patent [19]

Nishikawa

[11] Patent Number: 5,297,877
[45] Date of Patent: Mar. 29, 1994

[54] PRINTER HAVING COLOR DUMPING FUNCTION

[75] Inventor: Naoyuki Nishikawa, Kawasaki, Japan

[73] Assignee: Canon Kabushiki Kaisha, Tokyo, Japan

[21] Appl. No.: 813,500

[22] Filed: Dec. 26, 1991

[30] Foreign Application Priority Data

Dec. 28, 1990 [JP] Japan .............................. 2-409291
Nov. 25, 1991 [JP] Japan .............................. 3-309236

[51] Int. Cl.$^5$ .............................................. G06F 13/00
[52] U.S. Cl. ..................................... 400/76; 400/216.1
[58] Field of Search ............ 400/120 MC, 216.1, 240, 400/240.3, 76; 346/46; 395/109

[56] References Cited

FOREIGN PATENT DOCUMENTS

| 23090 | 2/1985 | Japan | 400/216.1 |
| 128783 | 6/1987 | Japan | 395/109 |
| 63-272144 | 11/1988 | Japan | 400/61 |
| 63-288562 | 11/1988 | Japan | 400/61 |
| 3-025611 | 2/1991 | Japan | 400/120 |

*Primary Examiner*—David A. Wiecking
*Assistant Examiner*—Steven S. Kelley
*Attorney, Agent, or Firm*—Fitzpatrick, Cella, Harper & Scinto

[57] ABSTRACT

An information generating apparatus by which selected code information is generated with a color that is different from that of other code information so as to highlight the selected code information. The apparatus includes a receiver which receives a group of code information, a selector which selects a desired piece of code information included in the code information group, and a detector which detects consumption amounts of coloring materials used when reproducing the code information group. The apparatus further includes a controller which controls operations so as to generate the selected code information by a color different from the color of the other code information when reproducing the code information group.

24 Claims, 14 Drawing Sheets

PRINTER HAVING COLOR DUMPING FUNCTION

BACKGROUND OF THE INVENTION

1. Field of the Invention

The invention relates to a printer having a dumping function to generate control codes which are sent from a host computer.

2. Related Background Art

Hitherto, when a control program for a print control is developed, there is a dumping function to print a control instruction which is sent from a host computer as a function which is used on the printer side in order to support the control program. By using the above function, not only it is easier to debug the print control program, also it is easier to detect an error of a communication system when data is transferred from the host computer to the printer side. An evaluation of the control program can also be easily obtained from a third party. By performing the evaluation, the reliability of a printer system is improved, and an unnecessary decrease in processing speed by the non-efficient print control process is avoided, thereby establishing an efficient print processing system.

In the recent printers, however, the number of different kinds of control commands exceeds 100 kinds, corresponding to an increase in printer functions. The contents of the control commands are also fairly complicated. Therefore, the program itself to control the printer is very complicated. Although the dumping function is a convenient function, a great amount of labor is required simply to analyze the enormous dump lists that are generated. For instance, when trying to determine where in data a print position designating instruction has been sent, it is difficult to search for such a position unless there is a mark.

When a great number of dump lists are generated, large quantities of print materials such as inks, toners, or the like are consumed, so that there is also a case where troubles occur when printing data.

SUMMARY OF THE INVENTION

According to the invention, by providing an apparatus in which a group of code information is received and color information is set to desired code information included in the code information group and the code information group is generated in accordance with the set color information, there is an effect such that a great amount of control instruction groups which are sent from a host computer can be easily analyzed.

To solve the above subject, the invention provides an apparatus in which a group of code information are received, desired code information included in the code information group is selected, a consumption quantity of a coloring material which is used when generating the code information group is detected, the color to generate the code information group is decided in accordance with the result of the detection, and a control is made so that the selected code information is generated by a color different from that of the other code information when the code information group is generated, so that in the case of using the dumping function such that it is not an object to print in an inherent beautiful style but it is sufficient to immediately know the content of the output result, by generating the code information by the color whose consumption quantity is small, a more economical dumping process such that no trouble occurs in the inherent print can be realized.

DESCRIPTION OF THE PREFERRED EMBODIMENTS

Figure 1:
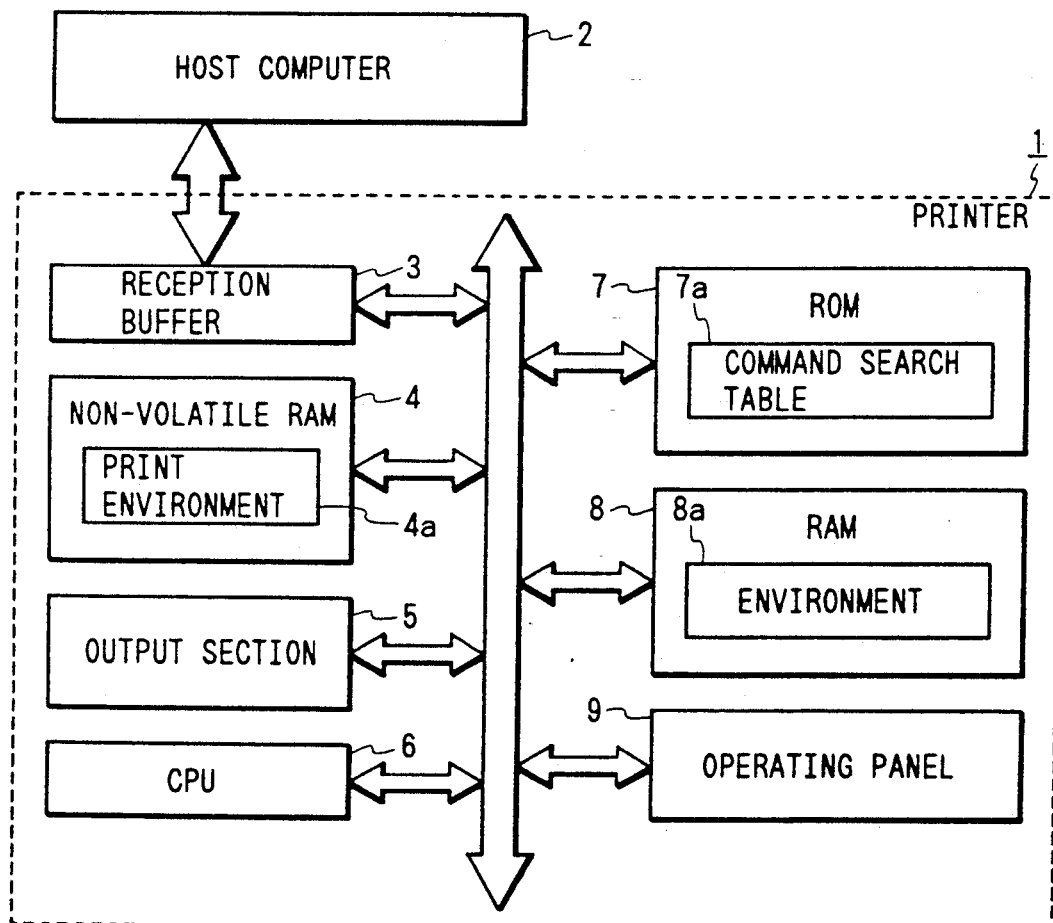
FIG. 1 is a first block diagram showing a construction of an information output apparatus of an embodiment.

FIG. 1 is a block diagram showing a construction of a printer of the embodiment. In FIG. 1, an external host computer 2 is connected through a connector (not shown) to a main body 1 of the printer shown by a block surrounded by a broken line in FIG. 1. The printer main body 1 receives a print instruction, an environment setting instruction to set an environment upon printing, output data, and the like from the host computer 2 side, thereby executing a print output.

The following components 3, 4, 5, 7, 8, and 9 are respectively connected through a system bus to a CPU 6 for arithmetic operation control to control the whole main body 1: namely, a reception buffer 3 to receive a print instruction, print data, and the like which are sent from the host computer 2; a non-volatile RAM 4 in which various kinds of setting information such as print mode, interface setting, and the like are permanently stored; an output section 5 to actually print; an ROM (read only memory) 7 in which programs to execute a series of control flows, which will be explained hereinlater, environment information, and the like recorded; an RAM (random access memory) 8 serving as a work area to execute the program; and an operating panel 9 to operate the main body 1. A power source (not shown) and various kinds of control signal lines such as a clock and the like are connected as necessary to those component elements.

Further, print environment information 4a which is used in the dumping mode is permanently recorded in the non-volatile RAM 4. A command search table 7a to search a control instruction is stored in the ROM 7. An environment information area 8a to temporarily store the present print environment is held in the RAM 8.

Generally, when the power source of the main body 1 is turned on, the operation to process a print control instruction is started. Such an operation is called an ordinary operating mode. The ordinary print and control instruction are executed in this operating mode. A process to allocate the color to each of the print control instructions is also executed in the above operating mode. On the other hand, there is a dumping mode. In the dumping mode, the actual control process is not performed. The instructions themselves are printed without interpreting all of the instructions. The operating mode is switched by depressing a switch (not shown) on the operating panel 9. The switched set mode information is stored into the environment information area 8a.

Outline of Processes of the Invention

Figure 2:
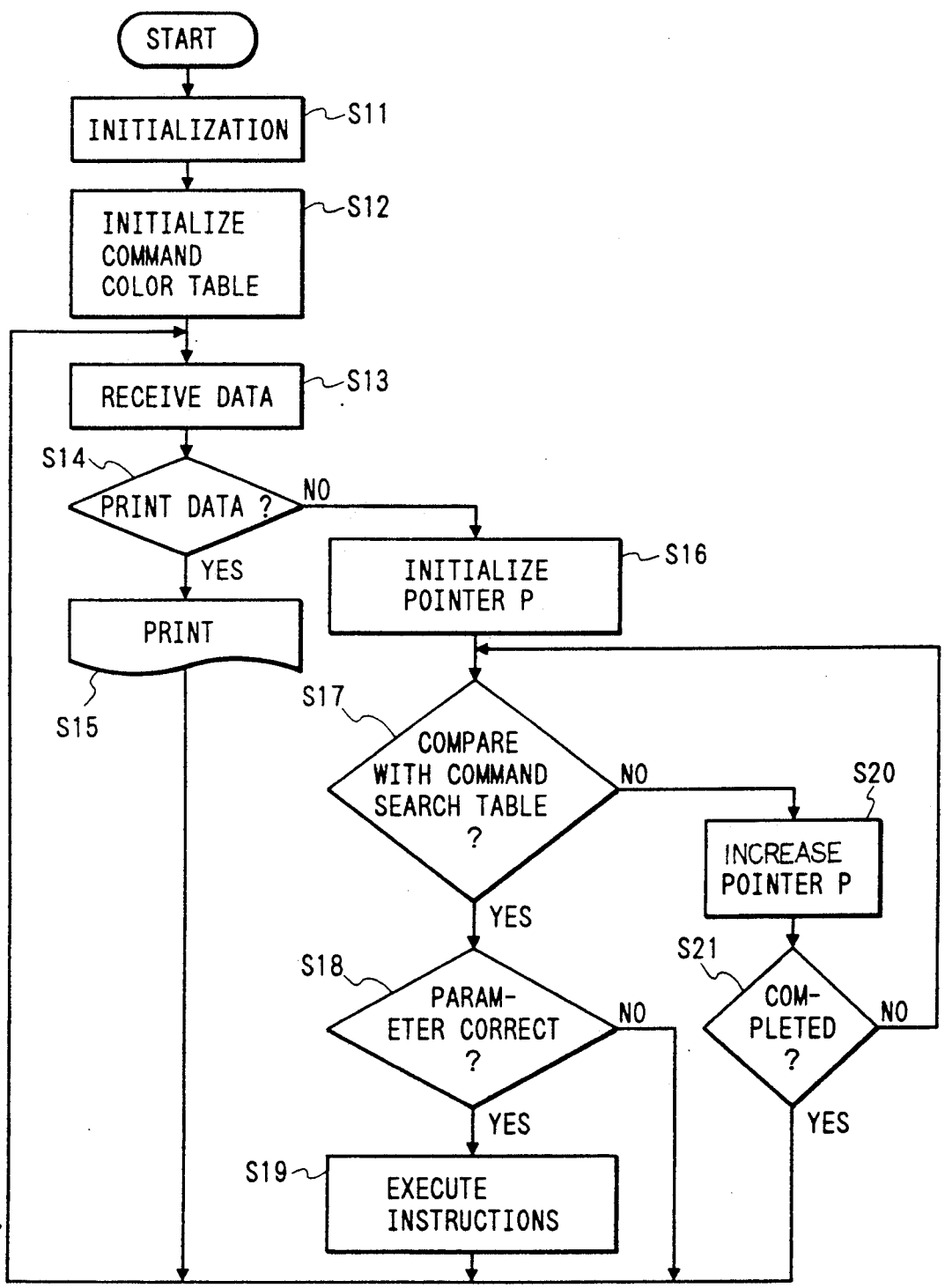
FIG. 2 is a first flowchart showing processes in the embodiment.
Figure 3:
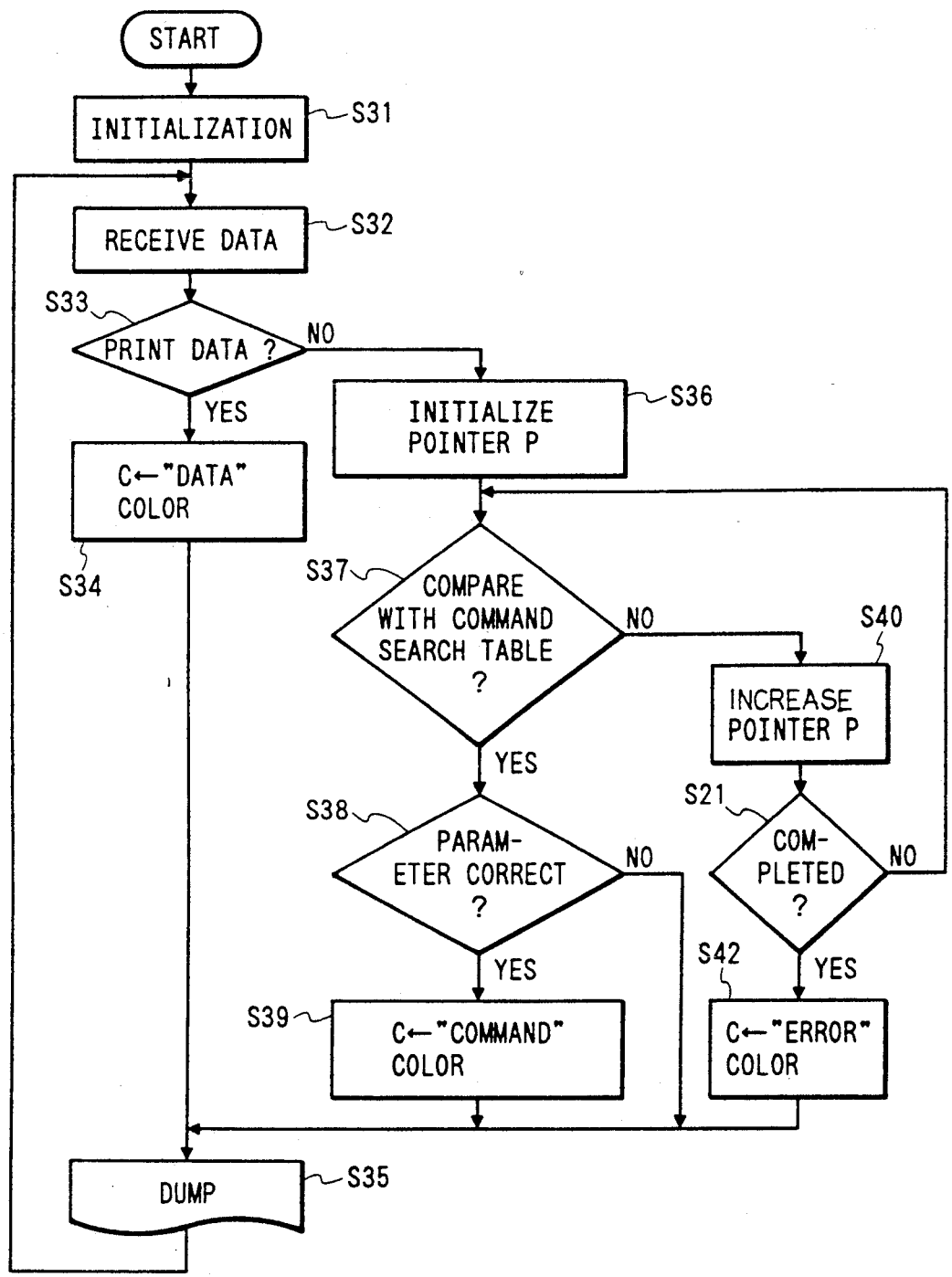
FIG. 3 is a second flowchart showing processes in the embodiment.

Two processes will be explained with respect to the schematic operation of the printer with the construction described by using a block diagram of FIG. 1 in accordance with flowcharts shown in FIGS. 2 and 3. One is a color allocating process to allocate the color to each of the print control instructions which the main body 1 has and this process is shown in the flowchart of FIG. 2. Another one is a dumping process to dump codes which are sent from the host computer 2 and the dumping process is shown in the flowchart of FIG. 3. In general, when the power source of the main body 1 is turned on, the operation to process the print control instruction is started. The color allocating process is executed in the above operating mode. To set the dumping mode, an interruption signal is generated by depressing a switch (not shown) on the operating panel 9 and the dumping process is executed from the color allocating process. On the contrary, the shift from the dumping process to the color allocating process is also performed by generating an interruption signal by depressing a switch (not shown) on the operating panel 9. Each of the above processes will now be described in accordance with the flowcharts.

FIG. 2 will now be described. FIG. 2 is a flowchart for explaining the color allocating process to allocate the color to each of the print control instructions which the main body 1 has. A method whereby the print control instructions themselves are processed will now be generally described and the execution of a command color setting instruction will be subsequently described.

In general, when the power source of the main body 1 is turned on, the initialization of each apparatus is executed in step S11. The environment information area 8a in the RAM 8 is initialized on the basis of the print environment information 4a which has been recorded in the non-volatile RAM 4 and in which information such as new paragraph width value, kind of character set, default color, and the like are included. In the next step S12, all of the colors which are allocated to the print control instructions are set to the same color. The above process is realized by writing the same color into the command color table in the environment information area 8a. For instance, assuming that black is allocated, all of the print control instruction groups which are generated in the dumping mode are printed in black in the initial state in which the power source is turned on. To change the print color, a command color setting instruction to allocate the color to each of the print control instructions is used.

In the next step S13, the main body 1 is set into a data reception standby mode and waits for the data from the host computer 2. When the data is sent from the host computer 2, it is temporarily stored into the reception buffer 3 and, after that, it is sent to the next process. In step S14, a check is made to see if the received data is the print data or the print control instruction. When it is the print data, step S15 follows. When it is the print control instruction, step S16 follows. In step S15, simple data, for instance, character such as "ABC" or the like are printed. After that, the main body 1 is returned to a data reception standby mode in step S13.

In step S16, a pointer P to indicate the command search table is initialized. In step S17, the received print control instruction is compared with the command search table. When they coincide, step S18 follows. When they differ, step S20 follows. In step S18, the designated parameter is examined. When it is correct, step S19 follows. When it is wrong, the processing routine is returned to step S13. In step S19, a function corresponding to each print control instruction is called. In step S20, the pointer P is increased. In step S21, a check is made to see if the examination has been completed or not. When the examination is not finished yet, the processing routine is returned to step S17. When the examination is completed, the processing routine is returned to step S13.

The execution of the command color setting instruction will now be described. The command color setting instruction is executed along the flow of the above processes in a manner similar to an ordinary instruction. The function corresponding to the above instruction relates to a process to rewrite a command color table in the environment information area 8a on the basis of a parameter associated with the instruction. The above instruction doesn't have any meaning in the modes other than the dumping mode.

FIG. 3 will now be described. FIG. 3 is the flowchart showing the dumping process of the main body 1 in the dumping mode. When the dumping mode is started by the operating panel 9, the environment information area 8a is initialized in step S31 on the basis of the print environment information 4a in the non-volatile RAM 4. However, only the command color table in the area 8a is not rewritten. At this time point, the print environment before the main body 1 enters the dumping mode is deleted and a constant environment is certainly held in the dumping mode.

In the next step S32, the main body 1 is set into the data reception standby mode and waits for the data from the host computer 2. When the data is sent from the host computer 2, it is temporarily stored into the reception buffer 3 and, after that, it is sent to the next process. A check is made in step S33 to see if the received data is the print data or the print control instruction. When it is the print data, step S34 follows. When it is the print control instruction, step S36 follows.

In step S34, a print color variable C is set into a color to print the data. In step S36, the pointer P to indicate the command search table is initialized. In step S37, the received print control instruction is compared with the command search table designated by the pointer P.

When they coincide, step S38 follows. When they differ, step S40 follows.

In step S38, a check is made to see if the parameter is correct or not. When it is correct, step S39 follows. When it is wrong, step S42 follows. In step S39, the color number corresponding to the command is extracted from the command color table and is set into the print color variable C. After that, step S35 follows.

In step S42, the print color when an error exists is taken out from the environment information area $8a$ and is set into the print color variable C. Then, step S35 follows. In step S40, the pointer P increases and a check is made in step S41 to see if the search has been finished or not. When the search is not yet finished, the processing routine is returned to step S35 and the searching operation is continued. After completion of the search, in the case where the corresponding print control instruction doesn't exist, an error occurs. In step S42, the print color when the error exists is taken out from the environment information area $8a$ and is set into the print color variable C. Step S35 then follows. The value of each variable is returned to the original value in step S35 and the actual dump list is printed. After the printing of the dump list was finished, the processing routine is returned to step S32 and the above processes are repeated.

Color Designating Process to Command

Processes to designate so as to add the color to a desired one of many kinds of commands to be printed in the dumping mode in the foregoing processes will now be described in detail.

Figure 4:
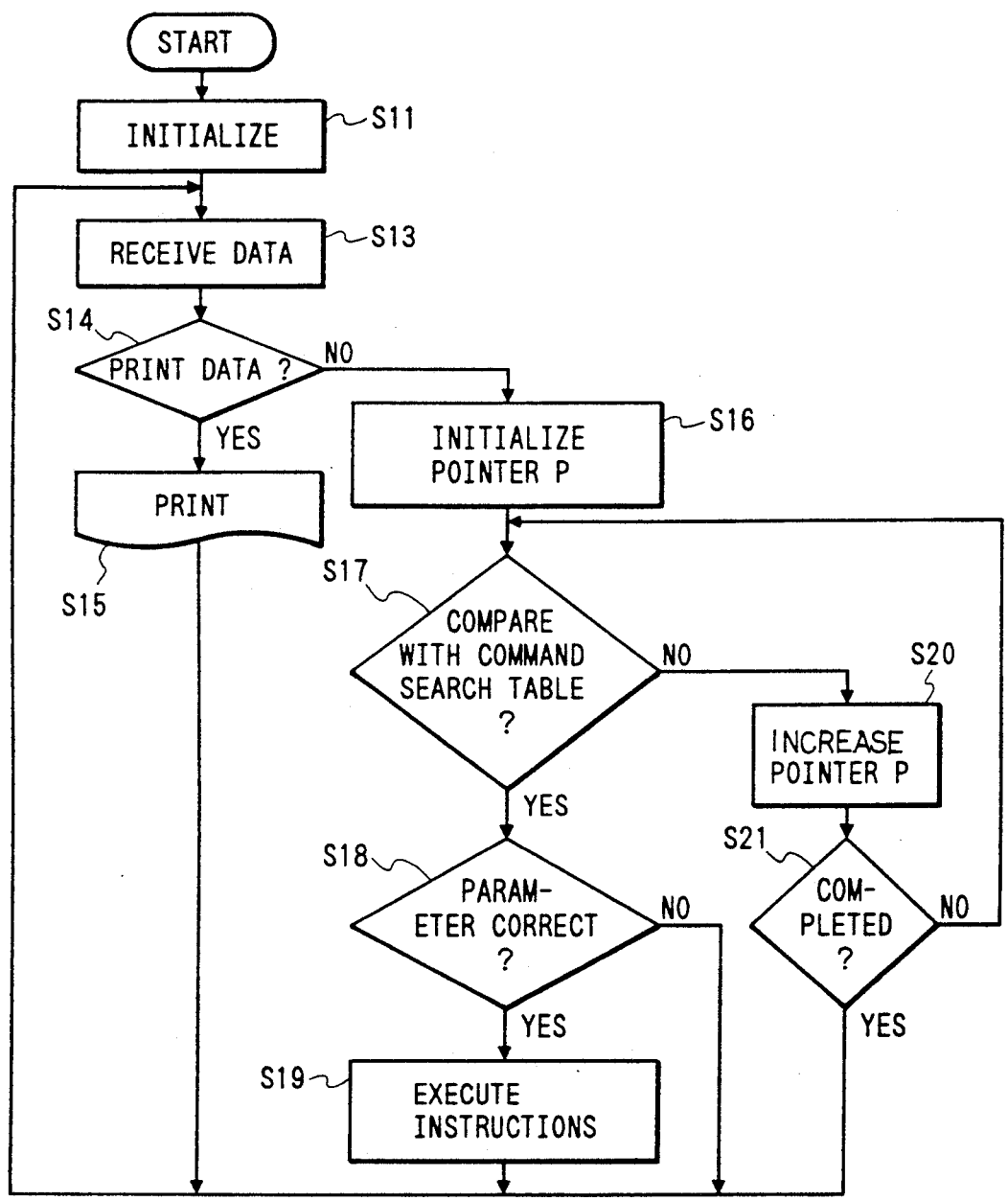
FIG. 4 is a third flowchart showing processes in the embodiment.

The flow of schematic processes is shown in the flowchart of FIG. 4. Since those processes are similar to those shown in the flowchart of FIG. 2, they are designated by the same step numbers shown in the flowchart of FIG. 2 and their descriptions are omitted here.

Figure 5:
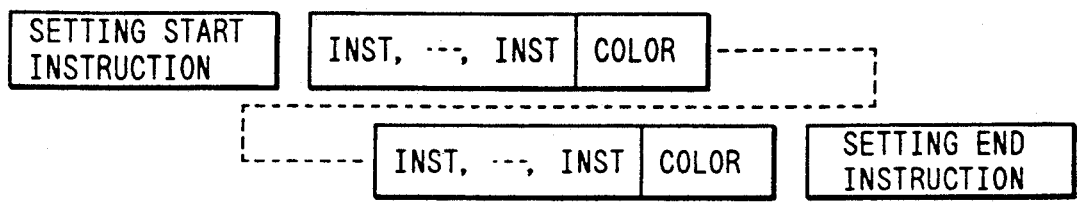
FIG. 5 is a diagram showing the first example of an instruction format when a color is designated for a command.

The command color setting instruction will now be described. The command color setting instruction is executed in accordance with the processing routine in FIG. 4 in a manner similar to the general instruction. As shown in FIG. 5, a format of the command color setting instruction is stored in the environment information area $8a$ as {setting start instruction for command color} (instruction, ..., instruction, setting color) ... (instruction, ..., instruction, setting color) {setting end instruction of command color}. Between the setting start instruction of command color and the setting end instruction of command color, each setting color can be designated for each of a plurality of combinations of arbitrary instructions. So long as the color corresponding to a combination of special instructions is previously set by the above instructions, the data is printed in the designated setting color when printing in the dumping mode. For instance, in the case where the commands such as {setting start instruction of command color}, (print position designation instruction, new paragraph instruction, red) {setting end instruction of command color} are sent to the printer, when the codes in which the print position designation instruction and the new paragraph instruction continue in the printing in the dumping mode are sent from the host computer, the print color is changed from black as an ordinary print color to red and the data is printed in red.

Figure 6:
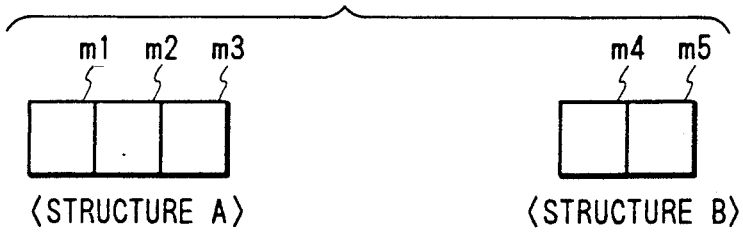
FIG. 6 is a diagram showing examples of structures of the instructions in FIG. 5.

FIG. 6 shows combinations of instructions which are stored in the RAM 8 and constructions of structures A and B which are used to record the information of the colors corresponding to the above instruction combination. The structure A is constructed by three elements $m_1$, $m_2$, and $m_3$. $m_1$ denotes an area to record the setting color. $m_2$ and $m_3$ denote areas to store point addresses. The structure B is constructed by two elements $m_4$ and $m_5$. $m_4$ denotes an area to record the kind of command. $m_5$ indicates an area to store a point address.

Figure 7:
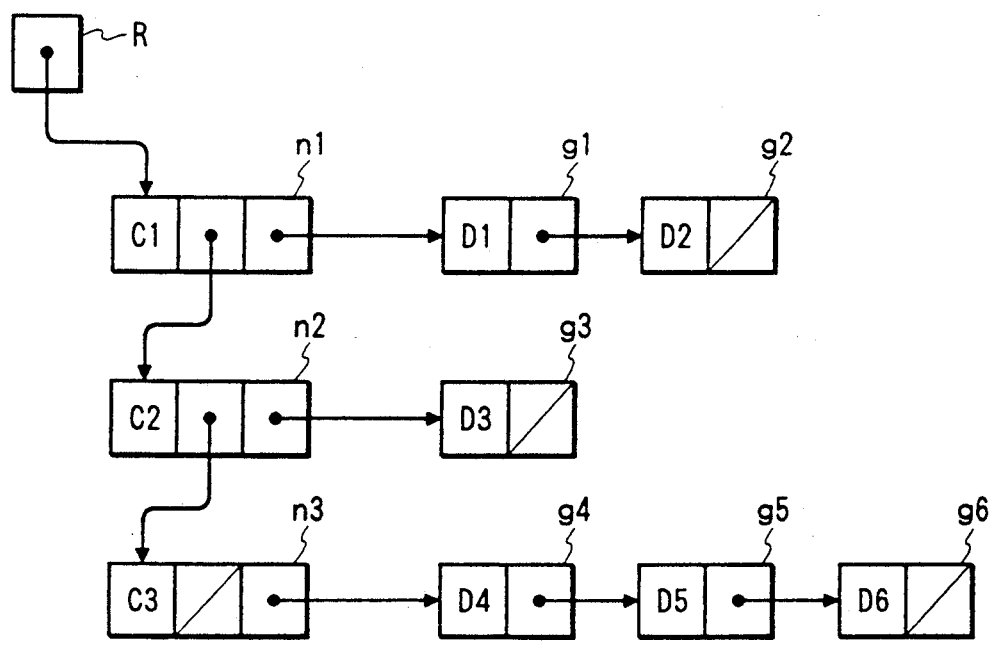
FIG. 7 is a diagram showing combination examples of the structures in FIG. 6.

The structures shown in FIG. 6 are coupled like an example shown in FIG. 7. A combination of the instructions and the information of the colors corresponding thereto are recorded in the structures. In FIG. 7, R denotes a pointer variable to designate the structure A; $n_1$, $n_2$, and $n_3$ indicate the structure A; and $g_1$, $g_2$, $g_3$, $g_4$, $g_5$, and $g_6$ represent the structure B. In the above example, there are three kinds of combinations of the instructions: $D_1$ and $D_2$; only $D_3$; and $D_4$, $D_5$, and $D_6$. The colors corresponding to those combinations are set to $C_1$ for the combination of the instructions of $D_1$ and $D_2$, $C_2$ for the instruction of $D_3$, and $C_3$ for the combination of the instructions of $D_4$, $D_5$, and $D_6$. The coupling starts from the pointer variable R. R points out the first structure $n_1$.

The element $m_1$ of $n_1$ records the setting color $C_1$, the element $m_2$ points out $n_2$, and the element $m_3$ points out $g_1$. The element $m_4$ of $g_1$ records the command $D_1$ and the element $m_5$ points out $g_2$. The element $m_4$ of $g_2$ records the command $D_2$ and the element $m_5$ points out nothing. This means that the combination of the instructions which are dump printed by the setting color $C_1$ is set to $D_1$ and $D_2$.

The element $m_1$ of $n_2$ records the setting color $C_2$, the element $m_2$ points out $n_3$ and the element $m_3$ points out $g_3$. The element $m_4$ of $g_3$ records the command $D_3$ and the element $m_5$ points out nothing. This means that the instruction which is dump printed by the setting color $C_2$ indicates $D_3$.

The element $m_1$ of $n_3$ records the setting color $C_3$, the element $m_2$ points out nothing, and the element $m_3$ points out $g_4$. The element $m_4$ of $g_4$ records the command $D_4$ and the element $m_5$ points out $g_5$. The element $m_4$ of $g_5$ records the command $D_5$ and the element $m_5$ points out $g_6$. The element $m_4$ of $g_6$ records the command $D_6$ and the element $m_5$ points out nothing. This means that the combination of the instructions which are printed by the setting color $C_3$ is set to $D_4$, $D_5$, and $D_6$.

Figures 8, 8A:
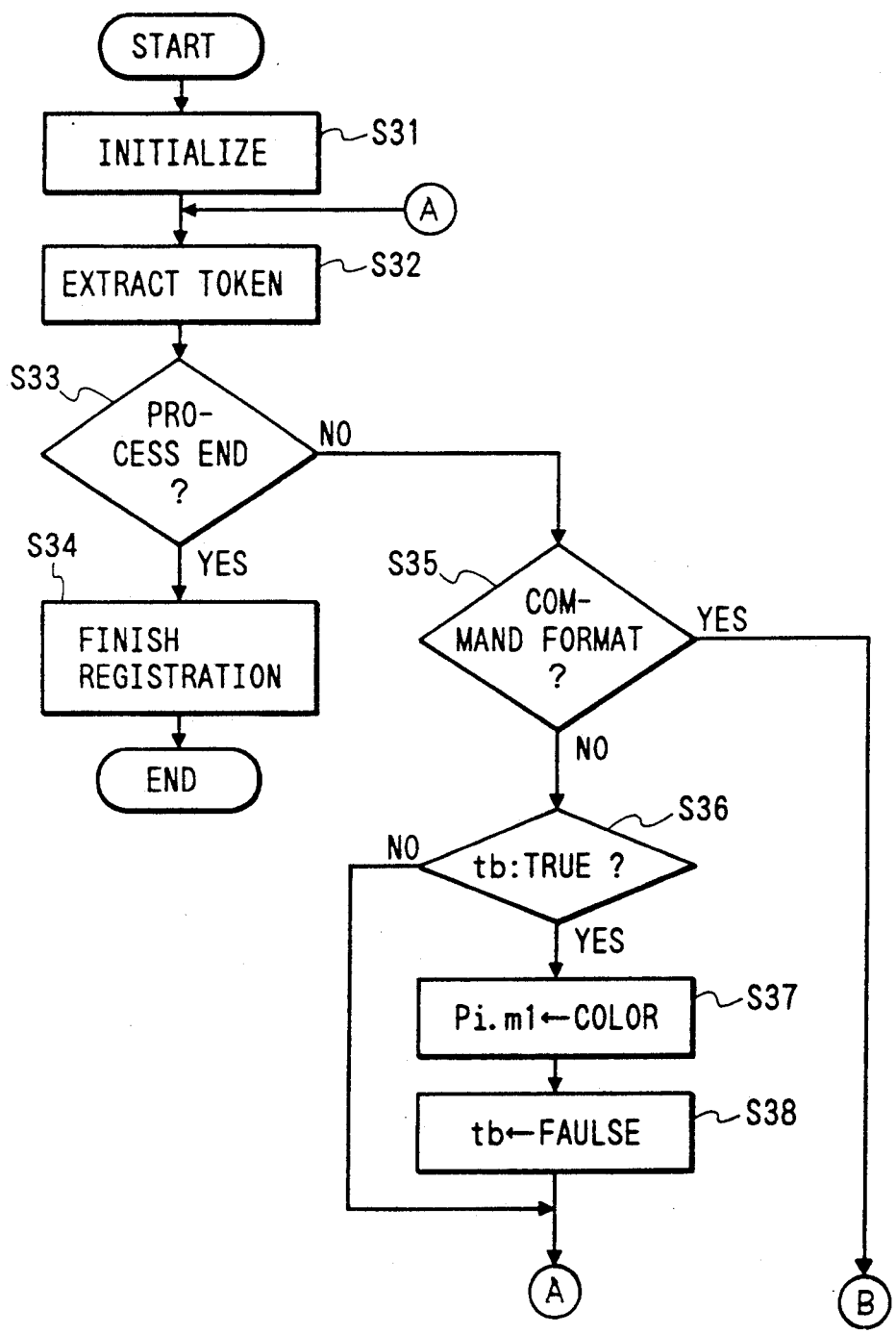
FIGS. 8, 8A and 8B are a fourth flowchart showing processes in the embodiment.
Figure 8B:
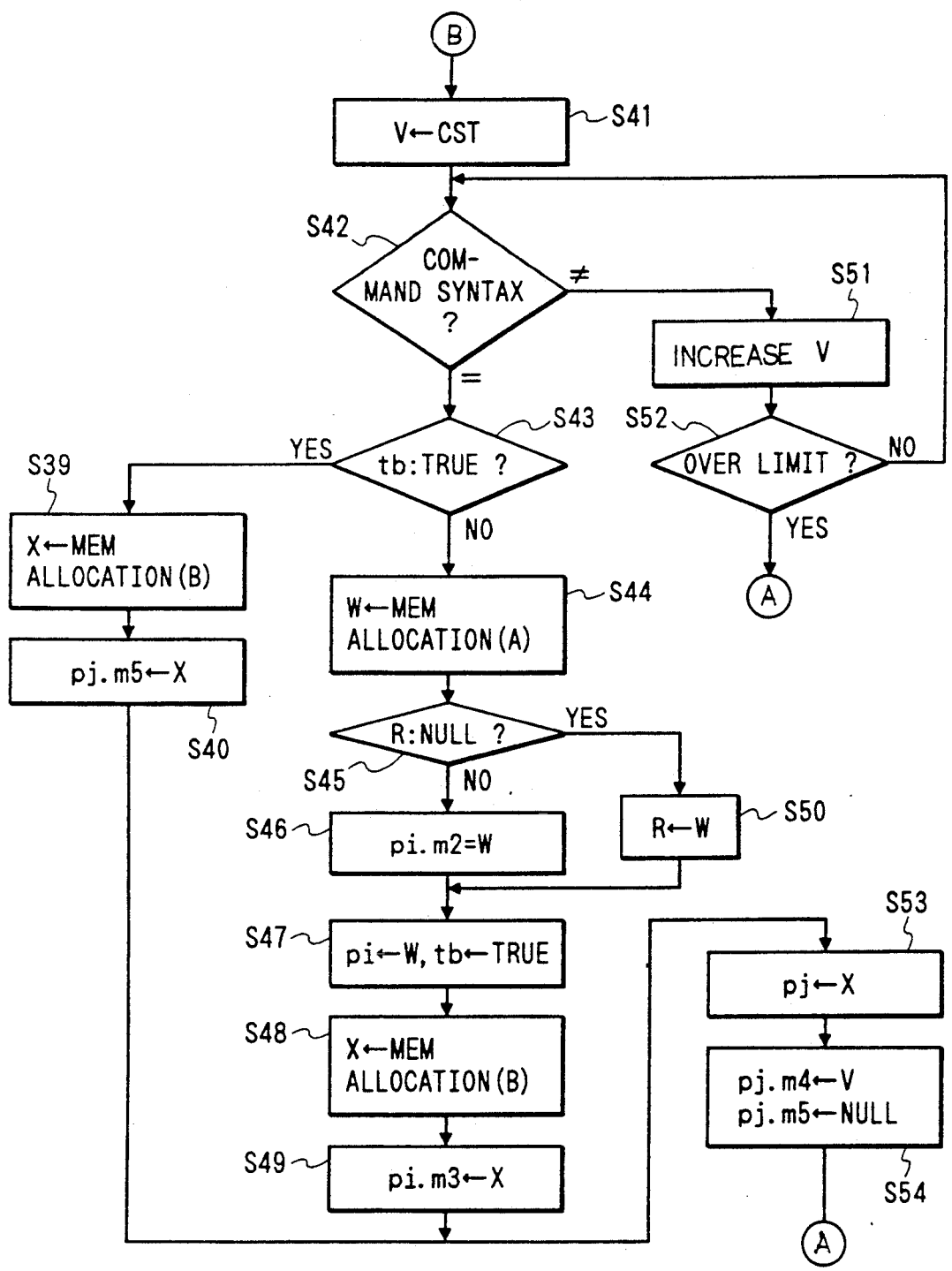

When the command color setting instruction is sent to the printer, it is processed in accordance with a processing routine in FIG. 4 mentioned above and reaches step S19. The processes which are executed by the function which is called in step S19 at that time will now be described in detail with reference to a flowchart of FIG. 8.

When the function to process the command color setting instruction is called, the variables and the like are first initialized in step S31, all of the pointer variables are substituted by NULL, the numeral variable is cleared, and the Boolean variable is substituted by FALSE. In the next step S32, a token is extracted from the reception buffer 3. In step S33, a check is made to see if the extracted token denotes the end of process or not. If YES, step S34 follows. If NO, step S35 follows. In step S35, a check is made to see if the extracted token denotes a command format or a character train indicative of the setting color. When it is the command format, step S41 follows. When it is the character train indicative of the setting color, step S37 follows.

A grammatical check is executed in step S41 and subsequent steps in order to register the combinations of the instructions. The correct instructions are linked like a chain. In the first step S41, a pointer variable CST indicating the head of the command search table 7a is substituted to a pointer variable V for comparison. In step S42, the command which is pointed out by the pointer variable V is compared with the extracted token, thereby checking a syntax. When they coincide, step S43 follows. When they differ, step S51 follows. In step S51, the pointer variable V is increased only one step in order to refer to the next instruction. In step S52, a check is made to see if the pointer variable V exceeds a limit or not. When it exceeds the limit, the processing routine is returned to step S32. If NO, the processing routine is returned to step S42. The command which coincides with the token extracted in step S32 is searched by a processing loop of step S42→step S51→step S52→step S42 . . . . When the coincident command is found out, it is registered in the processes in step S43 and subsequent steps. When there is no coincident command, the token is abandoned and the processing routine is returned to step S32 in order to extract the next token.

Processes to couple the pointer in order to register the commands are executed in step S43 and subsequent steps. First, when the value of a Boolean variable $t_b$ is TRUE in step S43, step S39 follows. In the other cases, step S44 follows.

Step S44 and subsequent steps relate to processes to link the commands in the vertical direction when registering an instruction group of a new combination. The link in the vertical direction denotes a link which progresses, for instance, R→$n_1$→$n_2$→$n_3$ in the case of an example shown in FIG. 5 mentioned above. On the other hand, the commands are linked in the lateral direction in the processing step S39 and subsequent steps. In the example of FIG. 5, such a processing routine corresponds to $g_1$→$g_2$.

In step S44, only one area in the structure A is assured and the head address is substituted to a pointer variable W. In step S45, when the value of the pointer variable R is NULL, step S50 follows. In the other cases, step S46 follows. In step S50, the value of the pointer variable W is substituted to the pointer variable R and step S47 follows. The pointer variable R denotes a pointer which is first referred to refer to the subsequent data coupled like a chain.

In step S46, the value of the pointer variable W is substituted to the element $m_2$ of the structure A which is pointed out by a pointer variable $p_i$. Step S47 then follows. In step S47, the value of the pointer variable W is substituted to the pointer variable $p_i$ and TRUE is substituted to the Boolean variable $t_b$. In step S48, only one area in the structure B is assured and the head address is substituted to a pointer variable X. In step S49, the value of the pointer variable X is substituted to the element $m_3$ of the structure A which is pointed out by the pointer variable $p_i$ and step S53 follows.

In step S39, only one area in the structure B is assured and the head address is substituted to the pointer variable X. In step S40, the value of the pointer variable X is substituted to the element $m_5$ of the structure B pointed out by a pointer variable $p_j$ and step S53 follows.

In step S53, the value of the pointer variable X is substituted to the pointer variable $p_j$. In step S54, the value of the pointer variable V is substituted to the element $m_4$ of the structure B pointed out by the pointer variable $p_j$ and the NULL pointer is substituted to the element $m_5$. The processing routine is returned to step S32.

In step S36, a check is made to see if the Boolean variable $t_b$ is TRUE or not. The Boolean variable $t_b$ indicates whether the command has been registered or not. When it is TRUE, the processing routine advances to step S37 in order to record the color for the series of registered commands. In the other cases, this means that no command is registered, so that the processing routine is returned to step S32 without performing any process.

In step S37, the token as a character train indicative of the setting color is substituted to the element $m_1$ of the structure A pointed out by the pointer variable $p_i$. In step S38, FALSE is substituted to the Boolean variable $t_b$ in order to indicate the absence of a group of commands which are at present being registered. The processing routine is returned to step S32.

Figure 9:
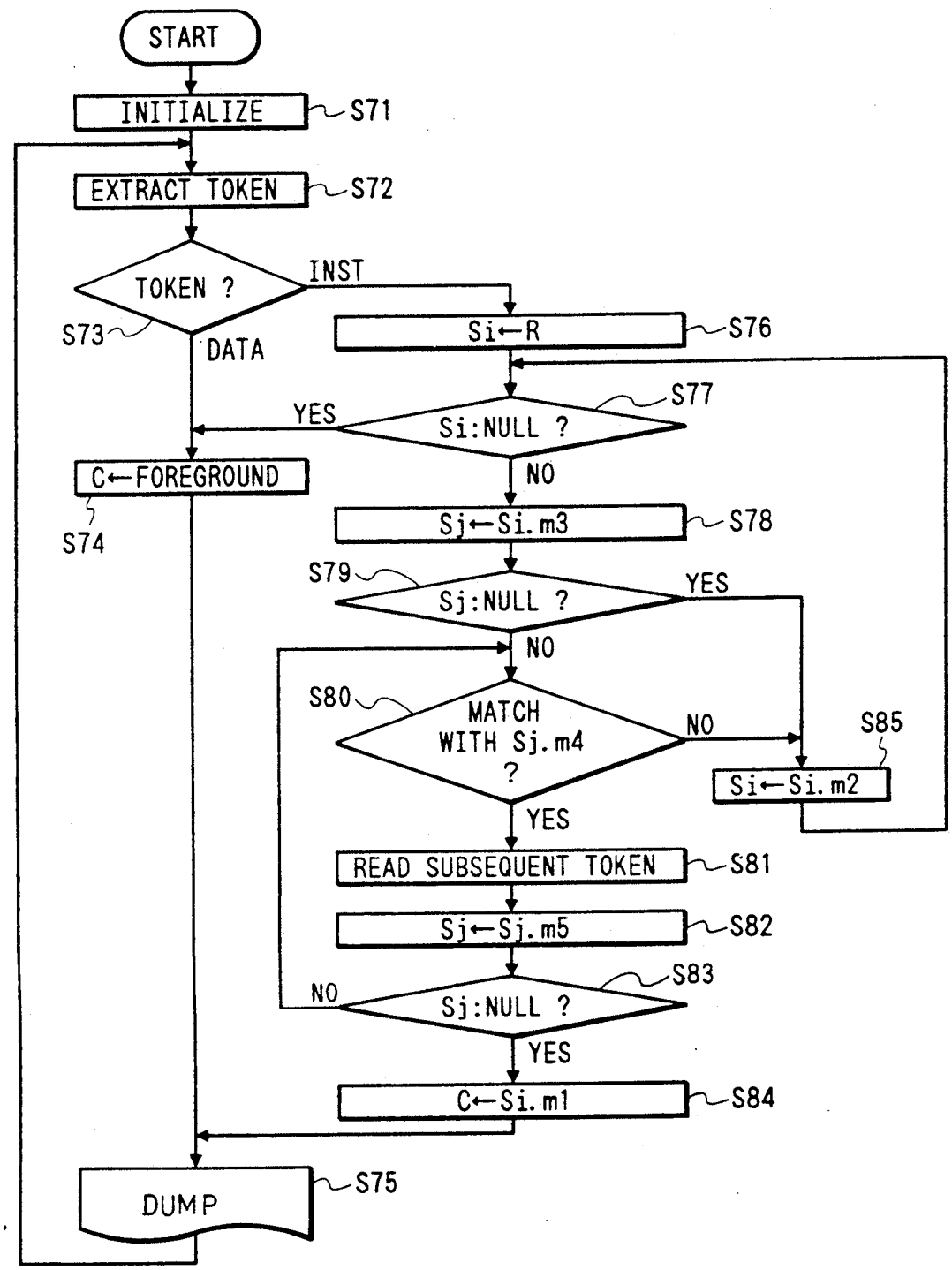
FIG. 9 is a fifth flowchart showing processes in the embodiment.

A flowchart of FIG. 9 will now be described. FIG. 9 is a flowchart showing the processes of the main body 1 in the dumping mode. When the main body 1 is set into the dumping mode by the operating panel 9, a part of the contents in the environment information area 8a is initialized in step S71 to print in the dumping mode on the basis of the print environment information 4a in the RAM 4. However, the foregoing pointer variable R, the combinations of the instructions which have been recorded after that, the information regarding the setting colors, and the like are not updated. By the initialization, the print environment in the ordinary operating mode is extinguished at a time point when the operating mode is shifted to the dumping mode. The printing operation is certainly executed in a constant environment in the dumping mode. In the next step S72, the main body 1 is set into the data reception standby mode and waits for the data from the host computer 2. When the data is sent from the host computer 2, it is temporarily stored into the reception buffer 3 and, after that, it is extracted as a token and the next process is started. In step S73, a check is made to see if the extracted token denotes the print data or the print control instruction. When it is the print data, step S74 follows. When it is the print control command, step S76 follows. In step S74, the foreground value preserved in the environment information 8a is substituted to the print color variable C and the ordinary print color is set.

In the process step S76 and subsequent steps, a check is made to see if the received data coincides with the command character train group registered in the pointer variable R and subsequent variables or not, and the color is temporarily switched to the registered setting color with respect to the coincident command character train and the data is printed by the switched color.

In step S76, the value of the pointer variable R is substituted to the pointer variable $S_i$ to refer to the registered information. In step S77, a check is made to see if the pointer variable $S_i$ denotes an NULL pointer or not. When it is NULL, step S74 follows. In the other cases, step S78 follows.

In step S78, the value of the element $m_3$ of the structure A pointed out by the pointer variable $S_i$ is substituted to the pointer variable $S_j$. In step S79, a check is made to see if the value of $S_j$ is NULL or not. When it is NULL, step S85 follows. In the other cases, step S80 follows. In step S80, a check is made to see if the token extracted on the basis of the value of the pointer indicating the command search table 7a recorded in the element $m_4$ of the structure B pointed out by the pointer variable $S_j$ is a target instruction or not. If YES, step S81 follows. If NO, step S85 follows. In step S85, the value of the element $m_2$ of the structure A which is at present pointed out by the pointer variable $S_i$ is substituted to the pointer variable $S_i$. The processing routine is returned to step S77. In step S81, the token registered in the reception buffer 3 is not extracted but is temporarily copied into another area, thereby temporarily reading the subsequent token after the token as a target of the verification at present. In step S82, the value of the element $m_5$ of the structure B which is at present pointed out by the pointer variable $S_j$ is substituted to the pointer variable $S_j$. In step S83, a check is made to see if the value of the pointer variable $S_j$ is NULL or not. When it is NULL, step S84 follows. In the other cases, the processing routine is returned to step S80. In step S84, the element $m_1$ of the structure A which is pointed out by the pointer variable $S_i$ is substituted to the print color variable C. Step S75 follows.

In step S75, the extracted token is dump printed by the color set into the print color variable C.

Process to Perform a Dump Output by the Color of a Small Consumption Amount

Figure 10:
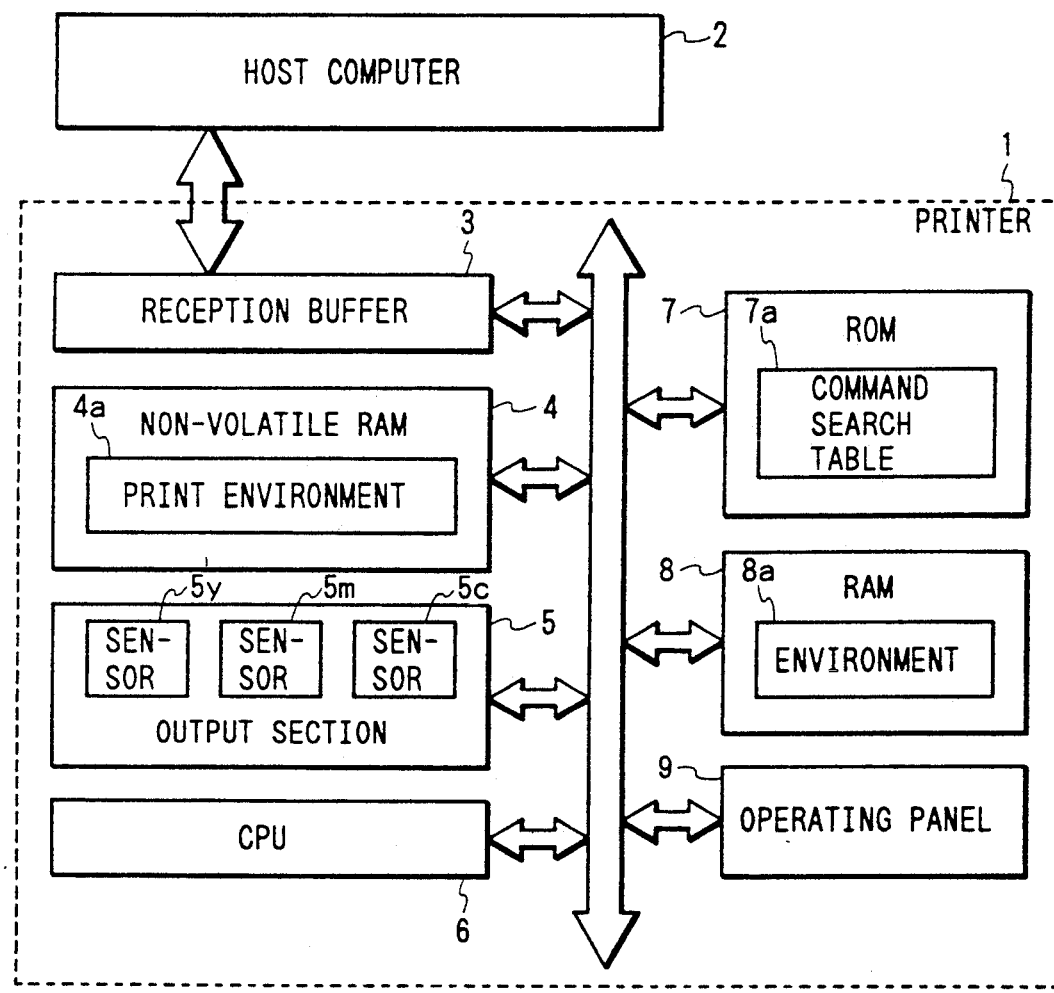
FIG. 10 is a second block diagram showing a construction of the information output apparatus of the embodiment.

A construction of an apparatus to execute the above process is almost similar to that in the block diagram of FIG. 1 which has already been described above. Therefore, its description is omitted here. In the output section 5, however, sensors to detect consumption amounts of print materials such as inks, toners, or the like are necessary. FIG. 10 shows an apparatus including those sensors. Reference numeral 5y denotes a sensor for a yellow print material, 5m indicates a sensor for a magenta print material, and 5c a sensor for a cyan print material.

Since the fundamental operations of the above processing routine are similar to those shown in the flowchart of FIG. 4, its description is omitted here.

Figure 11:
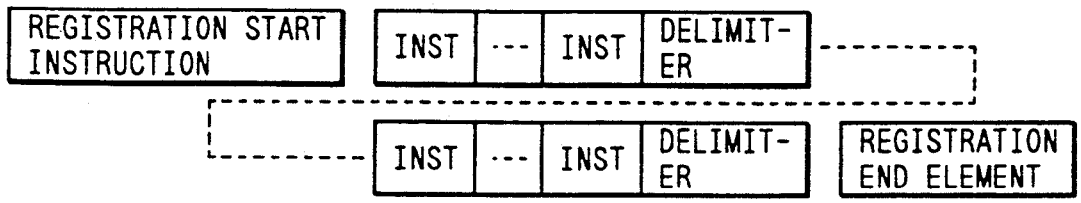
FIG. 11 is a diagram showing the second example of a registration instruction format of commands to be searched.

The command color setting instruction will now be described. The command color setting instruction is executed in accordance with a flow of the processes in FIG. 4 in a manner similar to an ordinary instruction. As shown in FIG. 11, it has a format such as {registration start instruction of commands to be searched} (instruction, . . . , instruction, delimiter) . . . (instruction, . . . , instruction, delimiter) {registration end element}. A plurality of combinations of arbitrary instructions can be designated between the registration start instruction of the commands to be registered and the registration end element. If a combination of special instructions is previously registered by the above instructions, when the data is printed in the dumping mode, the data is printed by either one of the colors of Y, M, and C of a small consumption amount in spite of the fact that the data is ordinarily printed in black. For instance, when the consumption amount of the magenta ink is small at a time point when the operating mode is shifted to the dumping mode, in the case where the instructions such as {registration start instruction of dump print extraction commands} (print position designation instruction, new paragraph instruction, delimiter) {registration end element} are sent to the printer, the print color is switched to magenta from black as an ordinary print color and the data is printed at a time point when the codes in which the print position designation instruction and the new paragraph instruction continue are sent from the host computer upon printing in the dumping mode.

Figure 12:
FIG. 12 is a diagram showing examples of structures of the instructions in FIG. 11.

FIG. 12 shows combinations of instructions and constructions of the structures A and B which are used to record the information of the colors corresponding to those combinations. The structure A is constructed by two elements $m_1$ and $m_2$. $m_1$ denotes an area to store a point address to indicate the structure A. $m_2$ denotes an area to store a point address to indicate the structure B. The structure B is constructed by two elements $m_3$ and $m_4$. $m_3$ denotes an area to record the kind of command. $m_4$ denotes an area to store the point address to indicate the structure B.

Figure 13:
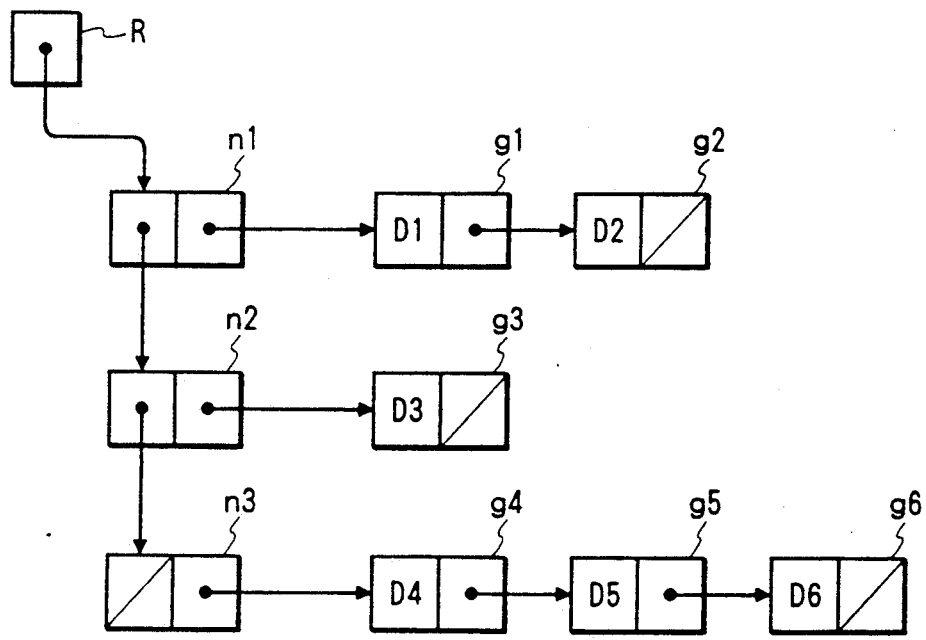
FIG. 13 is a diagram showing examples of combinations of the structures in FIG. 12.

The structures shown in FIG. 12 are coupled like an example shown in FIG. 13 and record therein the information regarding the combination of instructions. In FIG. 13, R denotes the pointer variable to designate the structure A; $n_1$, $n_2$, and $n_3$ denote the structure A; and $g_1$, $g_2$, $g_3$, $g_4$, $g_5$, and $g_6$ indicate the structure B. In the example, there are three kinds of combinations of the instructions to be extracted: a combination of $D_1$ and $D_2$; a combination of only $D_3$; and a combination of $D_4$, $D_5$, and $D_6$. The coupling is started from the pointer variable R. R points out the first structure $n_1$.

The element $m_1$ of $n_1$ points out $n_2$ and the element $m_2$ points out $g_1$. The element $m_3$ of $g_1$ records the command $D_1$ and the element $m_4$ points out $g_2$. The element $m_3$ of $g_2$ records the command $D_2$ and the element $m_4$ points out nothing. This means that one of the combinations of the instructions which are extracted in the dump printing mode is set to $D_1$ and $D_3$.

The element $m_1$ of $n_2$ points out $n_3$ and the element $m_2$ points out $g_3$. The element $m_3$ of $g_3$ records the command $D_3$ and the element $m_4$ points out nothing. This means that one of the combinations of the instructions which are extracted in the dump printing mode is set to $D_3$.

The element $m_1$ of $n_3$ points out nothing and the element $m_2$ points out $g_4$. The element $m_3$ of $g_4$ records the command $D_4$ and the element $m_4$ points out $g_5$. The element $m_3$ of $g_5$ records the command $D_5$ and the element $m_4$ points out $g_6$. The element $m_3$ of $g_6$ records the command $D_6$ and the element $m_4$ points out nothing. This means that one of the combinations of the instructions which are extracted in the dump printing mode is set to $D_4$, $D_5$, and $D_6$.

Figures 14, 14A, 14B:
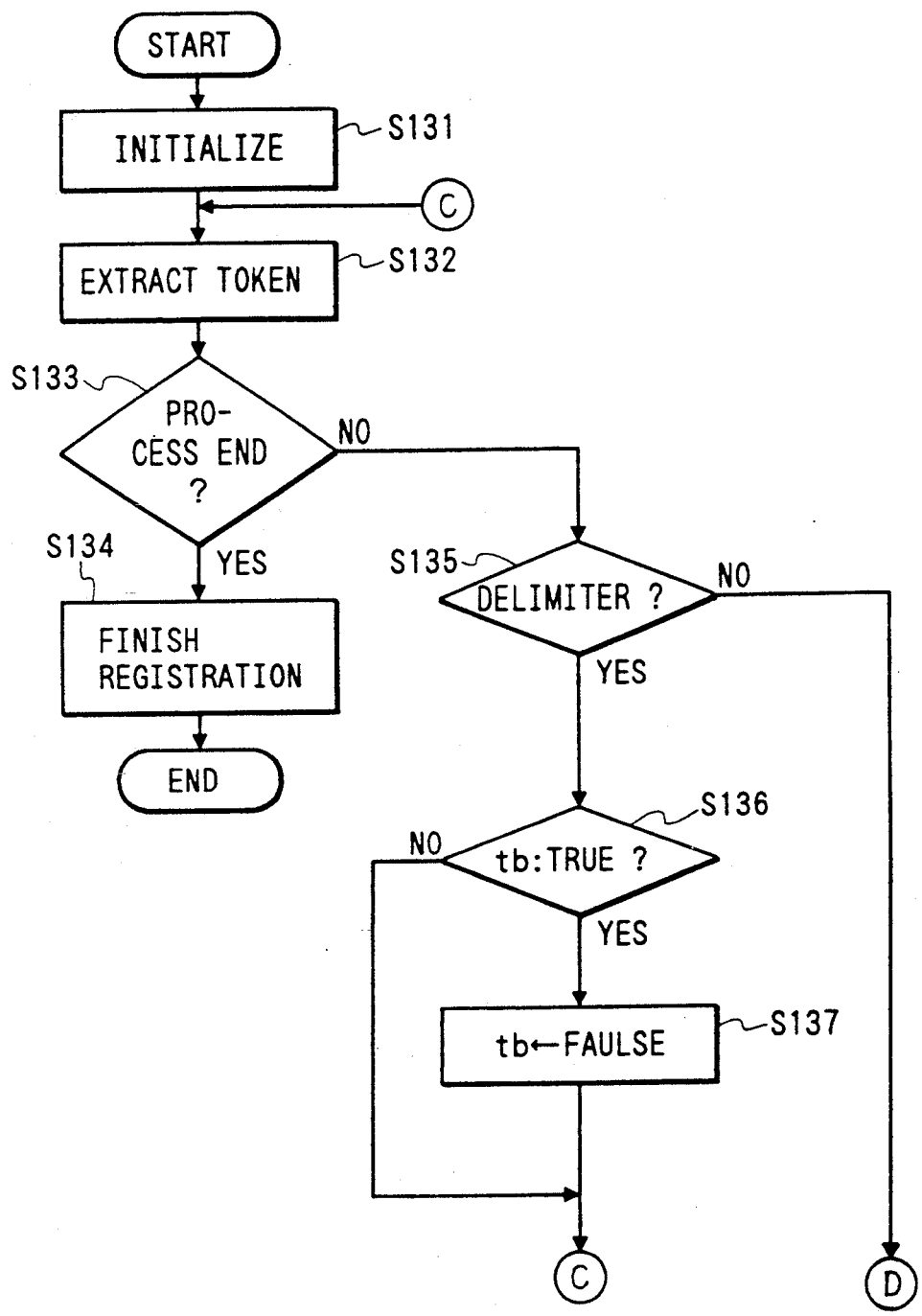
FIGS. 14, 14A and 14B are a sixth flowchart showing processes in the embodiment.
Figure 14B:
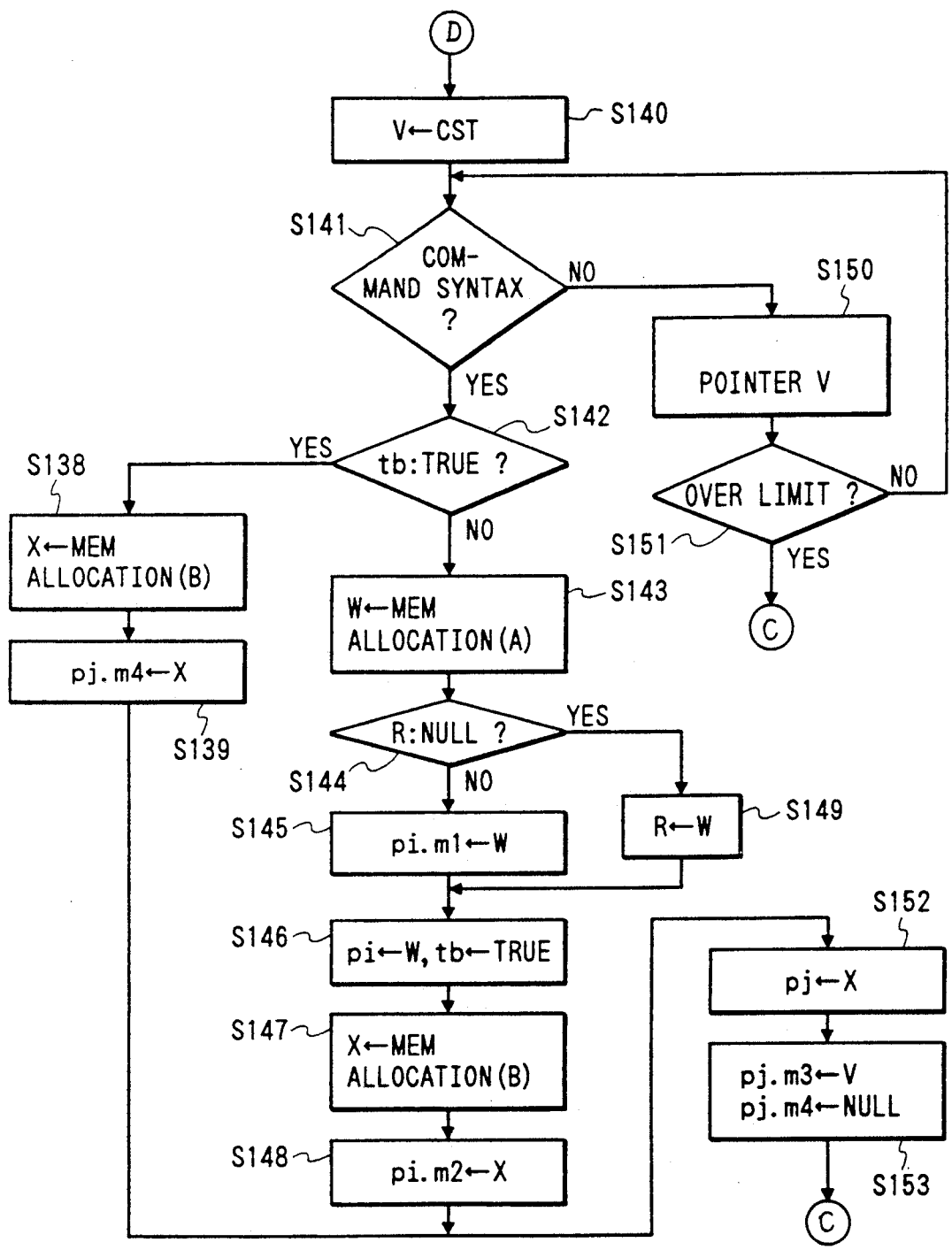

When the search target command registration instruction is sent to the printer, it is processed in accordance with the processing routine of FIG. 4 and reaches step S19. The processes which are executed by the function which is called in step S19 at that time point will now be described in detail by using a flowchart of FIG. 14.

When the function to process the search target command registration instruction is called, the variables and the like are first initialized in step S131, NULL is substituted to all of the pointer variables, the numeral variable is cleared, and FALSE is substituted to the Boolean variable. In the next step S132, the token is extracted from the reception buffer 3. In step S133, a check is made to see if the extracted token denotes an end of processes or not. If YES, step S134 follows. If NO, step S135 follows. In step S135, a check is made to see if the extracted token is a delimiter or not. If YES, step S137 follows. In the other cases, step S140 follows.

In step S140 and subsequent steps, a grammatical check is performed to register the combinations of instructions. With respect to the correct combination, the instructions are linked like a chain. First, in step S140, the pointer variable CST indicative of the head of the command search table 7a is substituted to the pointer variable V for comparison. In step S141, the command which is pointed out by the pointer variable V is compared with the extracted token, thereby executing a syntax check. When they coincide, step S142 follows. When they differ, step S150 follows. In step S150, the pointer variable V is increased by only one step in order to refer to the next instruction. In step S151, a check is made to see if the pointer variable V exceeds a limit or not. When it exceeds the limit, the processing routine is returned to step S132. If NO, step S141 follows. The command which coincides with the token extracted in step S132 is searched by executing a processing loop of step S141→step S150→step S151→step S141.... When the coincident command is found out, it is registered by the processes in step S142 and subsequent steps. When there is no coincident command, the token is abandoned and the processing routine is returned to step S132 to extract the next token.

In step S142 and subsequent steps, processes to couple the pointers in order to register the commands are executed. In step S142, the value of the Boolean variable $t_b$ is discriminated. When it is TRUE, step S138 follows. In the other cases, step S143 follows.

In step S143 and subsequent steps, processes to link the commands in the vertical direction when a group of instructions of a new combination are registered are performed. The link in the vertical direction denotes a link progressing like R→$n_1$→$n_2$→$n_3$ in the case of the example of FIG. 13. On the other hand, the link in the lateral direction corresponds to the processes in step S138 and subsequent steps. In the example of FIG. 13, the link in the lateral direction corresponds to $g_1$→$g_2$.

In step S143, only one area of the structure A is assured and the head address is substituted to the pointer variable W. When the value of the pointer variable R is NULL in step S144, step S149 follows. In the other cases, step S145 follows. In step S149, the value of the pointer variable W is substituted to the pointer variable R and step S146 follows. The pointer variable R is a pointer which is first referred in order to refer to the subsequent data coupled like a chain.

In step S145, the value of the pointer variable W is substituted to the element $m_1$ of the structure A which is pointed out by the pointer variable $p_i$. Step S146 then follows. In step S146, the value of the pointer variable W is substituted to the pointer variable $p_i$ and TRUE is substituted to the Boolean variable $t_b$. In step S147, only one area of the structure B is assured and the head address is substituted to the pointer variable X. In step S148, the value of the pointer variable X is substituted to the element $m_2$ of the structure A which is pointed out by the pointer variable $p_i$. Step S152 then follows.

In step S138, only one area of the structure B is assured and the head address is substituted to the pointer variable X. In step S139, the value of the pointer variable X is substituted to the element $m_4$ of the structure B which is pointed out by the pointer variable $p_j$. Step S152 then follows.

In step S152, the value of the pointer variable X is substituted to the pointer variable $p_j$. In step S153, the value of the pointer variable V is substituted to the element $m_3$ of the structure B which is pointed out by the pointer variable $p_j$ and the NULL pointer is substituted to the element $m_4$. Then, the processing routine is returned to step S132.

In step S136, a check is made to see if the Boolean variable $t_b$ is TRUE or not. The Boolean variable $t_b$ is a variable to indicate whether the commands have been registered or not. When it is TRUE, step S137 follows. In the other cases, this means that no command is registered, so that the processing routine is returned to step S132 without performing any process.

In step S137, in order to indicate the absence of the command group during the linking process, FALSE is substituted to the Boolean variable $t_b$. The processing routine is returned to step S132.

In step S134, the post process to complete the instruction is performed and the processes of the above function are completed.

Figure 15:
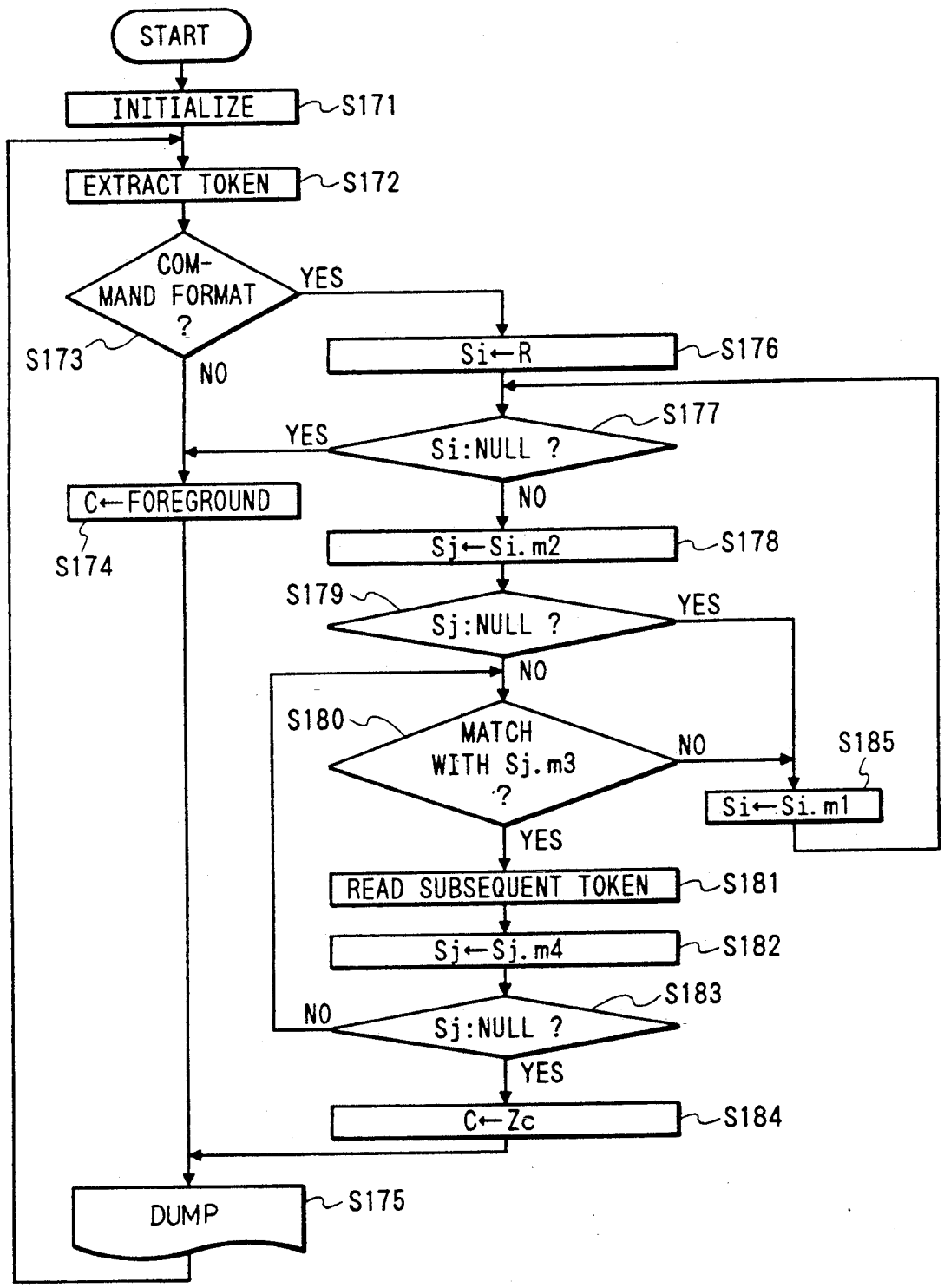
FIG. 15 is a seventh flowchart showing processes in the embodiment.

FIG. 15 will now be described. FIG. 15 is a flowchart showing processes of the main body 1 in the dumping mode. When the operating mode is shifted to the dumping mode by the operating panel 9, a part of the contents in the environment information area 8a is initialized for the print in the dumping mode on the basis of the print environment information 4a in the RAM 4 in step S171. However, the pointer variable R, combinations of instructions recorded after the pointer variable R, information regarding the setting colors, and the like are not updated. By the above initialization, the print environment in the ordinary operating mode is extinguished when the operating mode is shifted to the dumping mode. The printing operation is certainly executed in the constant environment in the dumping mode. When the initialization is performed, consumption amounts of inks are detected and the ink of a small consumption amount is selected and recorded into a variable $Z_c$. The above processes will be explained hereinafter by using a flowchart of FIG. 16.

In step S172, the main body 1 enters the data reception standby mode and waits for the data from the host computer 2. When the data is sent from the host computer 2, it is temporarily buffered into the reception buffer 3 and is extracted as a token after that. The processing routine advances to the next process. In step S173, a check is made to see if the extracted token is the print data or the print control instruction. When it is the print data, step S174 follows. When it is the print control instruction, step S176 follows. In step S174, the foreground value preserved in the environment information 8a is substituted to the print color variable C, thereby printing the data by the ordinary print color.

In the processing step S176 and subsequent steps, a check is made to see if the received data coincides with the command character train group registered after the pointer variable R or not, and the ink of a small consumption amount is used with respect to the coincident command, and the data is printed by temporarily switching the print color. In step S176, the value of the pointer variable R is substituted to the pointer variable $S_i$ to refer to the registered information. In step S177, a check is made to see if the pointer variable $S_i$ is an NULL pointer or not. When it is NULL, step S174 follows. In the other cases, step S178 follows.

In step S178, the value of the element $m_2$ of the structure A which is pointed out by the pointer variable $S_i$ is substituted to the pointer variable $S_j$. In step S179, a check is made to see if the value of $S_j$ is NULL or not. When it is NULL, step S184 follows. In the other cases, step S180 follows. In step S180, a check is made to see if the token extracted on the basis of the value of the pointer which indicates the command search table 7a recorded in the element $m_3$ of the structure B which is pointed out by the pointer variable $S_j$ is a target instruction or not. When it is a target instruction, step S181 follows. If NO, step S185 follows. In step S185, the value of the element $m_1$ of the structure A which is at present pointed out by the pointer variable $S_i$ is substituted to the pointer variable $S_i$ and the processing routine is returned to step S177.

In step S181, the token recorded in the reception buffer 3 is not extracted but is temporarily transferred into another area, thereby temporarily pre-reading the subsequent token after the token as a present target for verification. In the next step S182, the value of the element $m_4$ of the structure B which is at present pointed out by the pointer variable $S_j$ is substituted to the opinter variable $S_j$. In step S183, a check is made to see if the value of the pointer variable $S_j$ is NULL or not. When it is NULL, step S184 follows. In the other cases, the processing routine is returned to step S180. In step S184, the value of the variable $Z_c$ set in the initializing process in step S171 is substituted to the print color variable C and step S175 follows.

In step S175, the extracted token is dump printed by the color set in the print color variable C.

Figure 16:
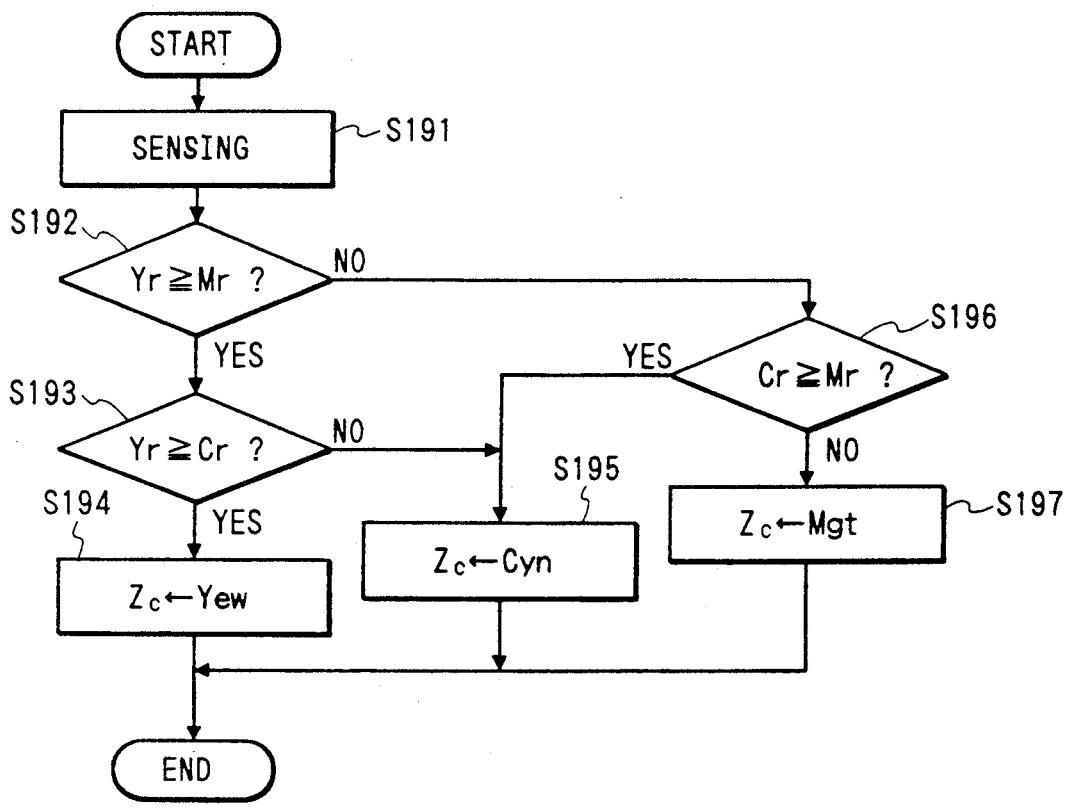
FIG. 16 is an eighth flowchart showing processes in the embodiment.

FIG. 16 is a flowchart showing processes for detecting present residual amounts of inks and for selecting the ink of a small consumption amount. Such processes are one of the initializing process which is executed when the operating mode is shifted to the dumping mode in the processing step S171 in FIG. 15.

In step S191, the signals of the ink consumption amount detection sensors $5y$, $5m$, and $5c$ associated for the output section 5 are read and the consumption amounts of variables $Y_r$, $M_r$ and $C_r$ are recorded. In step S192, the values of the variables $Y_r$ and $M_r$ are compared. When the value of the variable $Y_r$ is equal to or larger than the value of the variable $M_r$, step S193 follows. When the value of the variable $Y_r$ is smaller than the value of the variable $M_r$, step S196 follows. In step S193, the values of the variables $Y_r$ and $C_r$ are compared. When the value of the variable $Y_r$ is equal to or larger than the value of the variable $C_r$, step S194 follows. When the value of the variable $Y_r$ is smaller than the value of the variable $C_r$, step S195 follows. In step S196, the values of the variables $C_r$ and $M_r$ are compared. When the value of the variable $C_r$ is equal to or larger than the value of the variable $M_r$, step S195 follows. When the value of the variable $C_r$ is smaller than the value of the variable $M_r$, step S197 follows.

In step S194, a definition value $Y_{ew}$ is substituted to the variable $Z_c$. The definition value $Y_{ew}$ has previously been defined as a value indicating that the yellow ink is used as a print color.

In step S195, a definition value $C_{yn}$ is substituted to the variable $Z_c$. The definition value $C_{yn}$ has previously been defined as a value indicating that the cyan ink is used as a print color.

In step S196, a definition value $M_{gt}$ is substituted to the variable $Z_c$. The definition value $M_{gt}$ has previously been defined as a value indicating that the magenta ink is used as a print color.

What is claimed is:

1. An information generating method, comprising the steps of:
   receiving a group of code information;
   detecting consumption amounts of coloring materials which can be used when outputting the code information group; and
   determining a color to output the code information group in accordance with consumption amounts detected in said detecting step.

2. A method according to claim 1, wherein the color is a default color in said determining step.

3. A method according to claim 1, wherein the color is determined in said determining step in accordance with a detection of color material having the smallest consumption amount.

4. A method according to claim 1, further comprising the step of receiving a dump print instruction and wherein a detection is started in said detecting step when the dump print instruction is received.

5. A method according to claim 1, wherein a detection is performed in said detecting step using sensors for respective coloring materials.

6. An information generating apparatus comprising:
   receiving means for receiving a group of code information;
   detecting means for detecting consumption amounts of coloring materials which can be used when outputting the code information group; and
   determining means for determining a color to output the code information group in accordance with consumption amounts detected by said detecting means.

7. An apparatus according to claim 6, wherein said determining means determines a default color.

8. An apparatus according to claim 6, wherein said determining means determines the color in accordance with a detection of color material having the smallest consumption amount.

9. An apparatus according to claim 6, further comprising means for receiving a dump print instruction and wherein said detecting means starts a detection is started in said detecting step when the dump print instruction is received.

10. An apparatus according to claim 6, wherein said detecting means includes sensors for respective coloring materials.

11. A printing method comprising the steps of:
    a first receiving step of receiving a first control command;
    storing the first control command;
    a second receiving step of receiving a group of control commands;
    comparing each of the control commands in the received group of control commands to the stored first control command;
    setting a first color for one of the control commands in the received group of control commands when said comparing step shows that the one control command is identical to the stored first control command;
    setting a second color for another one of the control commands in the received group of control commands when said comparing step shows that the another one of the control commands is not identical to the stored first control command; and
    printing the received group of control commands in the first and second colors.

12. A method according to claim 11, wherein a plurality of first control commands are received in said first receiving step.

13. A method according to claim 11, wherein a combination of a plurality of first control commands are received in said first receiving step.

14. A method according to claim 11, wherein the second color is a color preset as a default color.

15. A method according to claim 11, wherein in said second receiving step, information comprising control commands and print character data are received in mixture.

16. A method according to claim 15, wherein the received information is transmitted from a host computer.

17. A method according to claim 11, wherein said steps are performed when a dump print instruction is received.

18. A printing apparatus comprising:
- a memory for storing a first control command;
- receiving means for receiving a group of control commands;
- a comparator for comparing each of the control commands in the received group of control commands to the first control command stored in said memory;
- means for setting a first color for one of the control commands in the received group of control commands when said comparator shows that the one control command is identical to the stored first control command, and for setting a second color for another one of the control commands in the received group of control commands when said comparator shows that the another one of the control commands is not identical to the stored first control command; and
- a printer for printing the received group of control commands in the first and second colors.

19. An apparatus according to claim 18, wherein a plurality of first control commands are stored in said memory.

20. An apparatus according to claim 18, wherein a combination of a plurality of first control commands are stored in said memory.

21. An apparatus according to claim 18, wherein the second color is a color preset as a default color.

22. An apparatus according to claim 18, wherein said receiving means receives information comprising control commands and print character data in mixture.

23. An apparatus according to claim 22, wherein the received information is transmitted from a host computer.

24. An apparatus according to claim 18, which is activated when a dump print instruction is received.

* * * * *

UNITED STATES PATENT AND TRADEMARK OFFICE
CERTIFICATE OF CORRECTION

PATENT NO. : 5,297,877
DATED : March 29, 1994
INVENTOR(S) : Naoyuki Nishikawa

It is certified that error appears in the above-identified patent and that said Letters Patent is hereby corrected as shown below:

Claim 9, column 14, lines 32-33, delete "is started".

Signed and Sealed this

Sixth Day of December, 1994

Attest:

BRUCE LEHMAN

Attesting Officer      Commissioner of Patents and Trademarks